United States Patent
Skrickij et al.

(10) Patent No.: US 12,388,882 B1
(45) Date of Patent: Aug. 12, 2025

(54) DETECTING INTERACTIVE CONTENT IN A MEDIA CONFERENCE

(71) Applicant: Amazon Technologies, Inc., Seattle, WA (US)

(72) Inventors: Jaroslav Skrickij, Mersch (LU); John Joseph Dunne, Bremerton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/489,452

(22) Filed: Sep. 29, 2021

(51) Int. Cl.
  *H04L 65/402* (2022.01)
  *G06N 20/00* (2019.01)
  *H04L 12/18* (2006.01)
  *H04L 65/403* (2022.01)

(52) U.S. Cl.
  CPC ......... *H04L 65/4025* (2022.05); *G06N 20/00* (2019.01); *H04L 12/1831* (2013.01); *H04L 65/403* (2013.01)

(58) Field of Classification Search
  CPC ............. H04L 65/4025; H04L 12/1831; H04L 65/403; G06N 20/00
  See application file for complete search history.

(56) References Cited

U.S. PATENT DOCUMENTS

| | | | | |
|---|---|---|---|---|
| 10,567,334 B1* | 2/2020 | Venkatesan | ......... | G06F 9/45558 |
| 10,706,322 B1* | 7/2020 | Yang | ...................... | G06V 10/82 |
| 11,165,755 B1* | 11/2021 | Qian | ....................... | H04N 5/272 |
| 2002/0135786 A1* | 9/2002 | Ma | ....................... | G06V 30/2455 358/1.1 |
| 2010/0246961 A1* | 9/2010 | Prasad | .................. | G06F 18/295 382/181 |
| 2013/0212490 A1* | 8/2013 | Scherpa | ............... | G06Q 10/101 715/753 |
| 2015/0103131 A1* | 4/2015 | Denoue | .................... | H04N 7/15 348/14.03 |
| 2017/0295260 A1* | 10/2017 | Pierce | ............... | G06F 16/24547 |
| 2019/0278640 A1* | 9/2019 | Khare | ................... | G06F 9/5027 |
| 2020/0175303 A1* | 6/2020 | Bhat | ....................... | H04L 51/10 |
| 2021/0334528 A1* | 10/2021 | Bray | ........................ | G06F 18/21 |
| 2021/0375324 A1* | 12/2021 | Morton | ................ | G11B 27/031 |
| 2022/0032471 A1* | 2/2022 | Singh | ..................... | G06F 3/0484 |
| 2023/0081717 A1* | 3/2023 | Hoang | ..................... | H04N 7/15 348/14.08 |
| 2023/0083688 A1* | 3/2023 | Janakiraman | ......... | G06F 3/0482 348/14.03 |
| 2023/0099034 A1* | 3/2023 | Le | ........................ | H04N 19/187 375/240.01 |
| 2023/0100862 A1* | 3/2023 | Varghese | ............ | H04L 65/1089 345/2.2 |

* cited by examiner

*Primary Examiner* — William G Trost, IV
*Assistant Examiner* — Abdelbasst Talioua
(74) *Attorney, Agent, or Firm* — BakerHostetler

(57) ABSTRACT

Implementations for detecting interactive content shared during media conferences are described. Initially, a frame to be presented to one or more participants during a media conference is received. Next, interactive content within the frame is identified. A bounding perimeter surrounding the interactive content is determined. At least one action based on the type of interactive content is determined. The bounding perimeter is transmitted for the interactive content within a plurality of frames to enable the at least one action associated with the interactive content.

20 Claims, 11 Drawing Sheets

DETECTING INTERACTIVE CONTENT IN A MEDIA CONFERENCE

BACKGROUND

Virtual meetings may involve the sharing of content, such as a presentation, in a video conference among participants. The shared content is typically presented as compressed video including a series of static images. Therefore, metadata for any interactive content, such as links or email addresses, in the shared content are not actionable by the participants within the video conference. Rather, a presenter must either send the original content via email, share the links or email addresses via a chat window, or allow the participants in the video conference time to write down the links or email addresses. These additional steps create overhead and hinder the presentation workflow.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

DETAILED DESCRIPTION

Figure 1A:
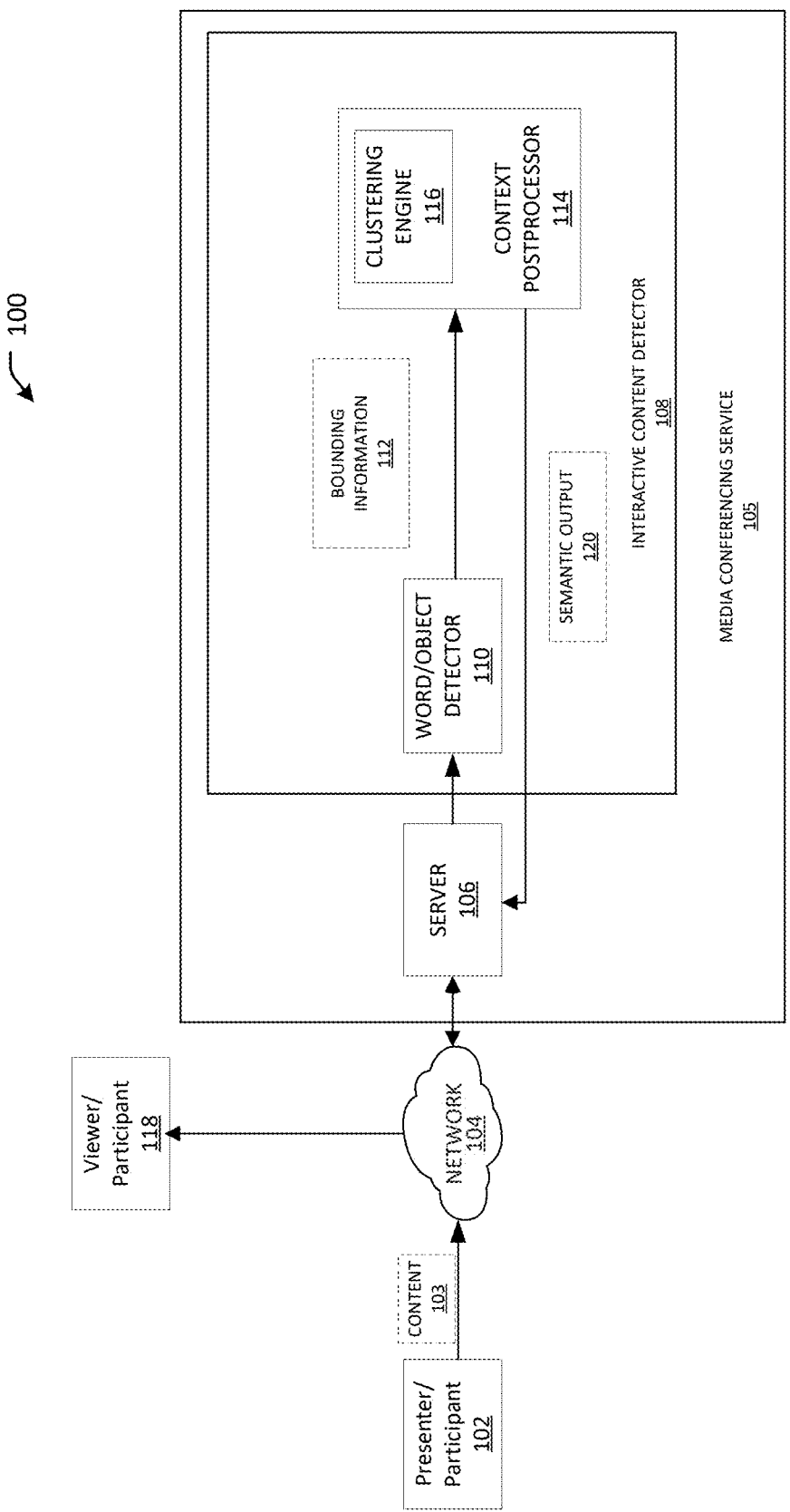
FIG. 1A schematically illustrates a high-level architecture of a media conferencing service that includes an interactive content detector.

This disclosure describes techniques and architecture for detecting interactive content being presented during a media conference and enabling selection of the interactive content by a participant in the media conference. The interactive content can be, for example, a Uniform Resource Locator (URL), an email address, a social media handle or username, a telephone number, a barcode, a street address, a GPS coordinate, a business name, a date and time, a unit of measure, an account number, personally identifiable information, or the like. The barcode can be, for example, a linear barcode or a two-dimensional barcode, such as a Quick Response (QR) code. Content being shared during a media conference, such as a presentation, video, image, website, etc., is typically transmitted and displayed as compressed video. Therefore, any metadata associated with interactive content included in the content, such links to various websites and articles, as well as contact information, such as email addresses, phone numbers, and social media identifiers, is lost in transmission. Rather than having to receive copies of the presented material via email or chat to access the interactive content, a participant may prefer to interact with the links or contact information directly within the media conference. Therefore, identification of the interactive content within the compressed video during the media conference is necessary.

The interactive content can be identified within individual frames of the shared content using a learning algorithm, such as a machine learning algorithm, or a pattern matching algorithm. For example, an email address being displayed in a media conference can be identified using a machine learning algorithm trained to identify email addresses. In another example, a barcode being displayed in a media conference can be identified using a machine learning algorithm trained to identify barcodes or using a pattern matching algorithm. In addition to identifying the interactive content and the type of interactive content, machine learning algorithms can be used to identify the boundaries of the interactive content. In some embodiments, these features can be executed by the hosting servers of the media conferencing service, while in other embodiments, these features can be executed on the presenter's system due to the processing and associated costs for these features in the cloud.

Upon identification of interactive content in the shared content, an overlay can be created to bound the interactive content. For example, a bounding box can be overlaid on the interactive content during the media conference. Although a bounding box is illustrated in the present disclosure, any shape can be used for the overlay to bound the interactive content. In some embodiments, instead of an overlay, the interactive content can be highlighted. Upon interaction with the overlay, such as a participant in the media conference moving a cursor within the overlay, a participant in the media conference moving his or her finger within the overlay, or a participant in the media conference selecting a region within the overlay, available actions associated with the interactive content can be displayed to the participant.

The available actions can be specific to the type of interactive content identified. For example, if an email address or social media identifier is identifier, one of the available actions may be to send a message, whereas if an address is identified, one of the available actions may be to open the address in a mapping application. The available actions for each type of interactive content can be stored in a configuration file, such as a lookup table. The configuration file may be associated with the media conferencing service or may be associated with an operating system of a participant device.

The available actions can be customized by the media conferencing service or by an organizer of the media conference, or can be default actions associated with an application or an operating system. For example, an operating system may default to enable a user to visit a social media profile in response to identification of a social media handle. However, an organizer of the media conference may not desire for the participants to visit social media profiles during the media conference as it may distract from the workflow of the media conference. Therefore, the organizer of the media conference may only enable saving of social media handles during the media conference. In another example, the default settings of a participant device may be to send a message or create a new contact when a new email address is identified. In such an example, the actions presented to a user during the media conference may be the default actions of sending a message or creating a new contact. However, it may not be practical to send messages during a media conference, so participant can then customize the available action in response to identification of an email address to only creating a new contact.

In some embodiments, the identification of the interactive content can be enabled or disabled by the media conferencing service or by an organizer of the media conference. For example, an organizer may not want to bear the costs associated with identification of the interactive content and may, therefore, disable the identification of the interactive contents during a media conference. In some embodiments, the identification of interactive content can be disabled during a media conference until content starts to be shared during the media conference.

The plurality of different actions can be presented to the participants for selection in response to interaction with the interactive content. For example, if an email address is identified in the shared content, an overlay can surround the email address upon a cursor moving within the overlay. The participant can then be provided the options of sending an email to the email address or creating a new contact including the email address during the media conference. In another example, if a barcode is identified in the shared content, a bounding box can surround the barcode upon a cursor moving within the overlay. The participant can then be provided with the options of accessing a link associated with the barcode or bookmarking the link associated with the barcode.

Certain implementations and embodiments of the disclosure are described more fully below with reference to the accompanying figures, in which various aspects are shown. However, the various aspects may be implemented in many different forms and should not be construed as limited to the specific implementations described herein. The disclosure encompasses variations of the described embodiments.

FIG. 1A illustrates a high-level architecture 100 of a media conferencing service that includes an interactive content detector, according to an embodiment. One or more participant devices 102, such as a presenter, may provide content 103, such as a presentation, video, image, website, etc. to a media conferencing service 105 via a network 104. The media conferencing service 105 can be, for example, video conferencing, chatting, gaming services, etc. The media conferencing service 105 can be implemented in one or more computing systems, such as one or more hosting servers 106, as explained in further detail below, which receive the content 103 via the network 104. The media conferencing service 105 can process the content received from the one or more participant devices 102 and output the processed content, such as the processed audio signals and/or video signals, over the network 104 to one or more output devices, such as the other participant devices 118 simultaneously. The participant devices 102 and 118 can be, for example, a laptop, a desktop computer, a portable computing device, a smart phone, a tablet, and/or a display, such as a television, etc.

The shared content 103 may be sent to the server 106 as compressed video comprising sequential frames. While the original files being shared may include metadata associated with interactive content, converting the original files into compressed video for transmission to the other participants may result in removal of such metadata. Therefore, the interactive content detector 108 identifies interactive content within one or more frames to be presented to the participants of the media conference. The interactive content detector 108 determines text, such as a Uniform Resource Locator (URL), an email address, a social media handle or username, a telephone number, a street address, a GPS coordinate, a business name, a date and time, a unit of measure, an account number, or personally identifiable information, or an object, such as a barcode, that is interactive.

In some embodiments, the interactive content detector 108 can include a word/object detector 110 and a context postprocessor 114. The word/object detector 110 can detect one or more words or one or more objects within a frame. In some embodiments, the word/object detector 110 may generate a bounding perimeter around each interactive object depicted in the frame. The bounding perimeter outlines the interactive object within a coordinate space defined for the frame using, for example, a height and width of the interactive object, a center point of the interactive object, an orientation of the interactive object, and/or coordinates of corners of the interactive object. The dimensions of the bounding perimeter can be adjusted based on the display preferences of each participant. For example, if one participant zooms into the shared content, the dimensions of the boundary perimeter can be increased and the center point of the bounding perimeter can be adjusted to overlap with the interactive content. The word/object detector 110 may include a character or text recognition system. The character or text recognition system may incorporate a machine learning algorithm. The bounding perimeter information 112 can be transmitted, for example, as a JavaScript Object Notation (JSON) file.

In some embodiments, the interactive content detector 108 can identify interactive content within each frame to be presented to the participants of the media conference. In other embodiments, however, the interactive content detector 108 can identify interactive content only within frames signifying a content change. For example, the first slide of a presentation may be transmitted using a first group of frames and a second slide of the same presentation can be transmitted using a second group of frames. The interactive content detector 108 can identify interactive content within the first slide only within the first frame of the first group of frames and then can identify other interactive content within the second slide only within the first frame of the second group of frames, thereby conserving computational resources. The frames signifying a content change can be identified as the keyframes, or I-frames, within the compressed video or can be identified using a content change detector. In some embodiments, instead of identifying keyframes, the content change detector can determine whether the pixels or objects between two consecutive frames differ by more than a threshold amount. If the change is greater than the threshold amount, the frame can signify a change of content and be analyzed by the interactive content detector 108.

In some embodiments, the interactive content detector 108 can identify interactive content within a frame that is received a predetermined amount of time after the last frame that is analyzed by the interactive content detector 108. For example, instead of detecting a change in content to analyze a frame, the interactive content detector 108 can identify interactive content in frames separated by a predetermined amount of time, such as 5 seconds.

The word/object detector 110 provides the bounding perimeter information 112 to the context postprocessor 114. In some embodiments, the context postprocessor 114 uses the bounding perimeter information 112 to determine metadata about the word or object included inside the bounding perimeter. The metadata may include the type of the interactive content and the location information for the interactive content. For example, the type of interactive content can be a Uniform Resource Locator (URL), an email address, a social media handle or username, a telephone number, a barcode, a street address, a GPS coordinate, a business name, a date and time, a unit of measure, an account number, or personally identifiable information.

In some embodiments, the context postprocessor 114 can include a clustering engine 116. The clustering engine 116 can determine metadata relating to relationships between a plurality of bounding perimeters. The clustering engine 116 may perform one or more clustering algorithms to cluster a set of bounding boundaries identified by the word/object detector 110 into a single bounding perimeter. For example, the word/object detector 110 can detect individual words that may together make up interactive content.

Figure 2A:
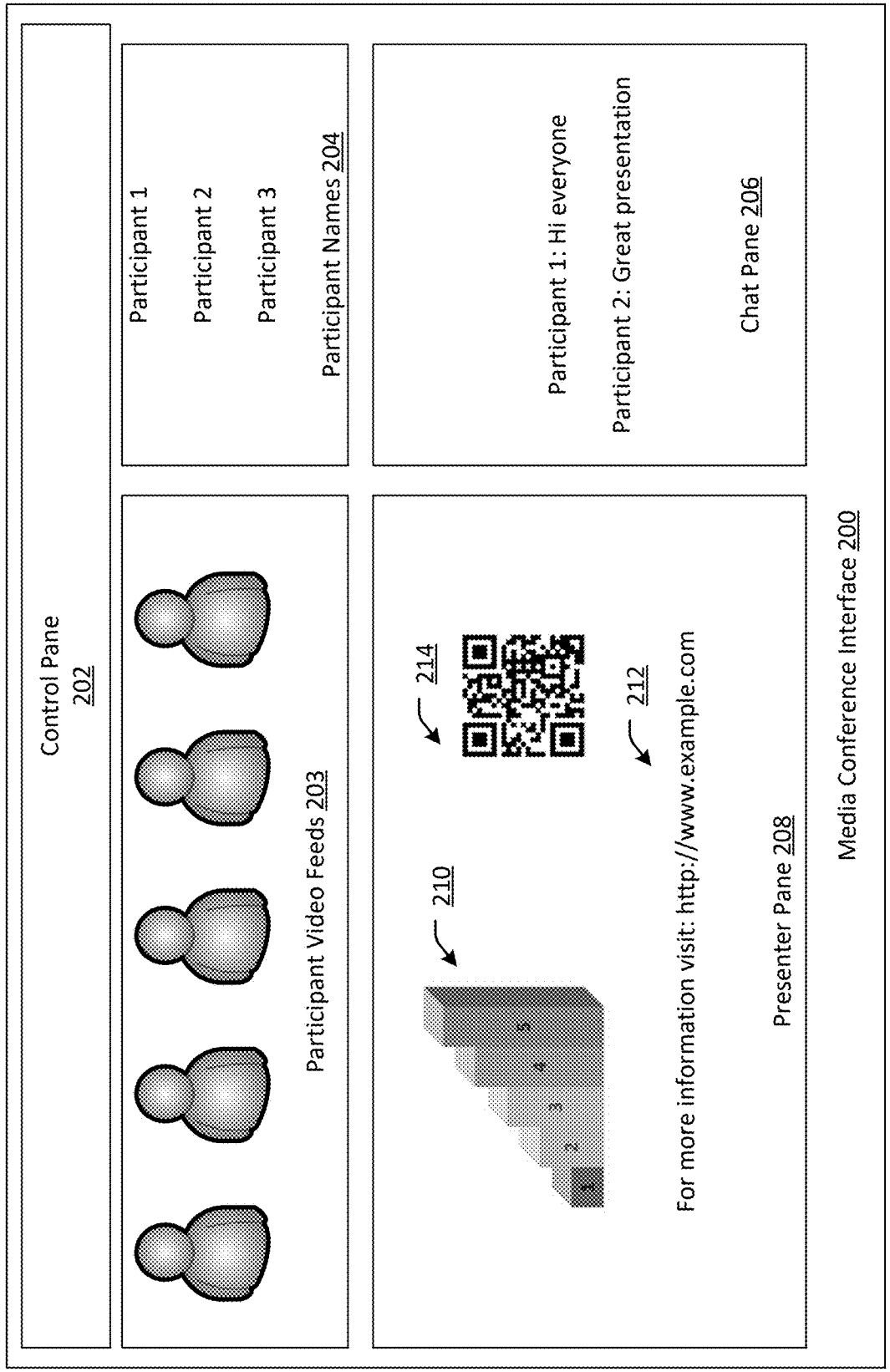
FIGS. 2A-C schematically illustrate an example layout and interactive overlays provided by the media conferencing service.

Referring to FIG. 2A, an example layout provided by a media conferencing service is illustrated. The media conference interface 200 may be configured based on customized programmable instructions, which may be JavaScript code, Hypertext Markup Language (HTML), Extensible Markup Language (XML), WebAssembly (Wasm), or the like. The media conference interface 200 includes a plurality of virtual surfaces, such as a control pane 202 that allows a participant to access various options of the media conference, one or more participant video feeds 203, pane 204 that include identifiers of the one or more participants, a chat pane 206, and a presenter pane 208. The panes 202, 203, 204, 206, and 208 are screen areas within various content can be displayed with different size, shape, position, and/or other characteristics. In addition to the panes 202, 203, 204, 206, and 208, other content can also be displayed in the media conference interface 200, such as a poll question and checkboxes corresponding to various different poll answers or other types of input relating to the video display or the presenter.

The presenter pane 208 may be displaying a presentation originating from a presenter of the media conference. The presentation may include a bar chart 210, a URL 212, and a two-dimensional barcode 214. The interactive content in the presentation, such as the URL 212 and the two-dimensional barcode 214, may not be actionable by the participants of the media conference during the media conference as the presentation is transmitted to the participants of the media conference as compressed video. As such, the interactive content detector 108 can identify the URL 212 and the two-dimensional barcode 214 to enable user action of the two types of interactive content during the media conference.

Figure 2B:
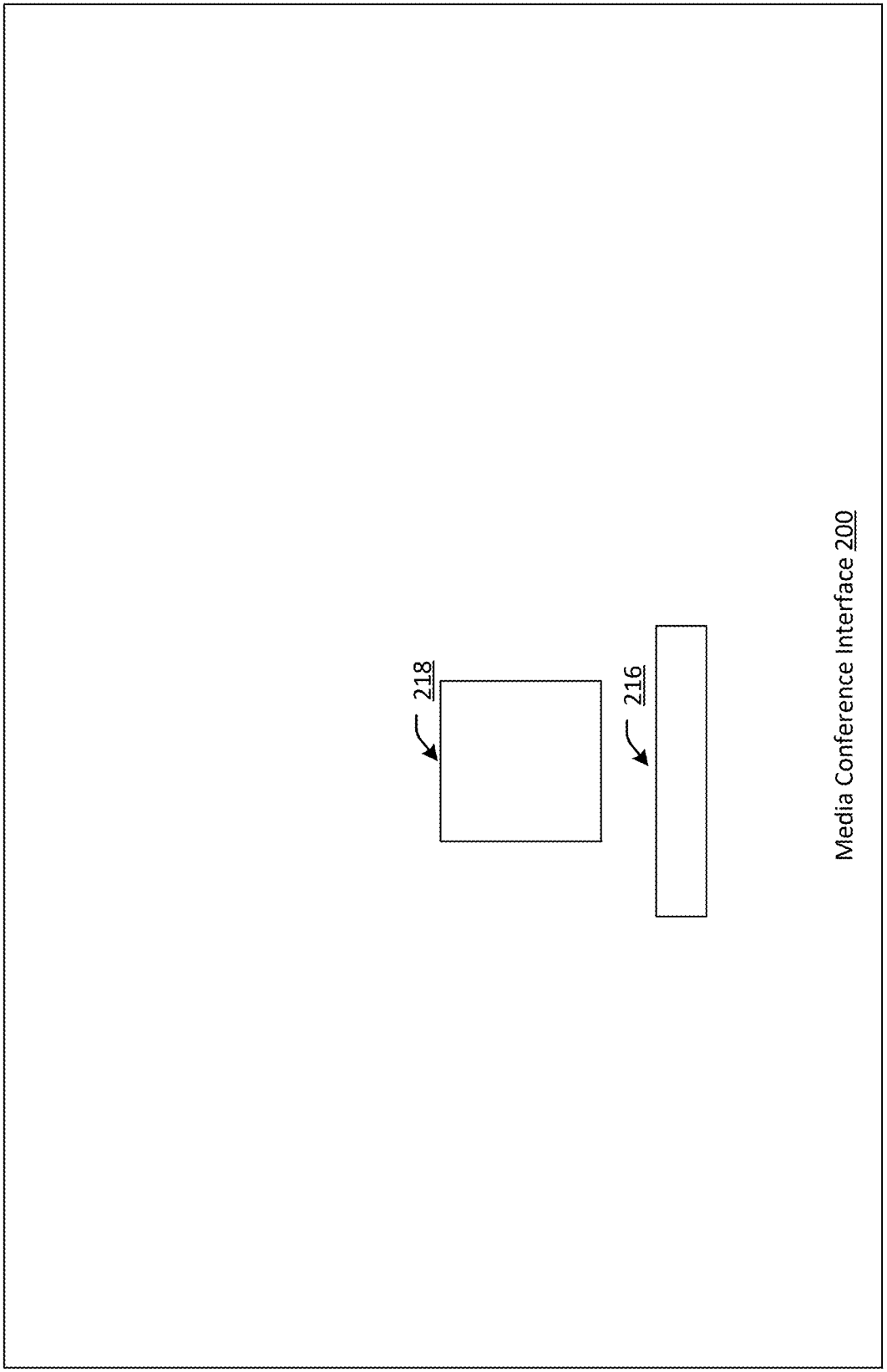

For example, the word/object detector 110 may identify each of the words "For more information visit: http://www.example.com" from a frame of the video stream of the shared presentation. Each word may be identified by the word/object detector 110 using optical character recognition. Each identified word may be provided with a separate boundary perimeter by the word/object detector 110. The clustering engine 116 may then identify a type of interactive content, such as a URL relationship between the identified words "http://www.example.com", and cluster the bounding perimeters of the identified words into a single boundary for the URL, such as the single boundary 216 illustrated in FIG. 2B. In another example, the word/object detector 110 may identify a first name, last name, and social media handle as separate boundaries. The clustering engine 116 may identify the relationship between the names and social media handles to cluster the identified words into a single boundary.

In another example, the word/object detector 110 may identify the two-dimensional barcode 214 as an object above the URL 212 in the frame of the video stream of the shared presentation. As a single object, the two dimensional barcode 214 may be provided with a single bounding perimeter by the word/object detector 110, such as the bounding perimeter 218 illustrated in FIG. 2B. Therefore, clustering of the bounding perimeter of the two-dimensional barcode 214 by the clustering engine 116 may not be required.

Figure 2C:
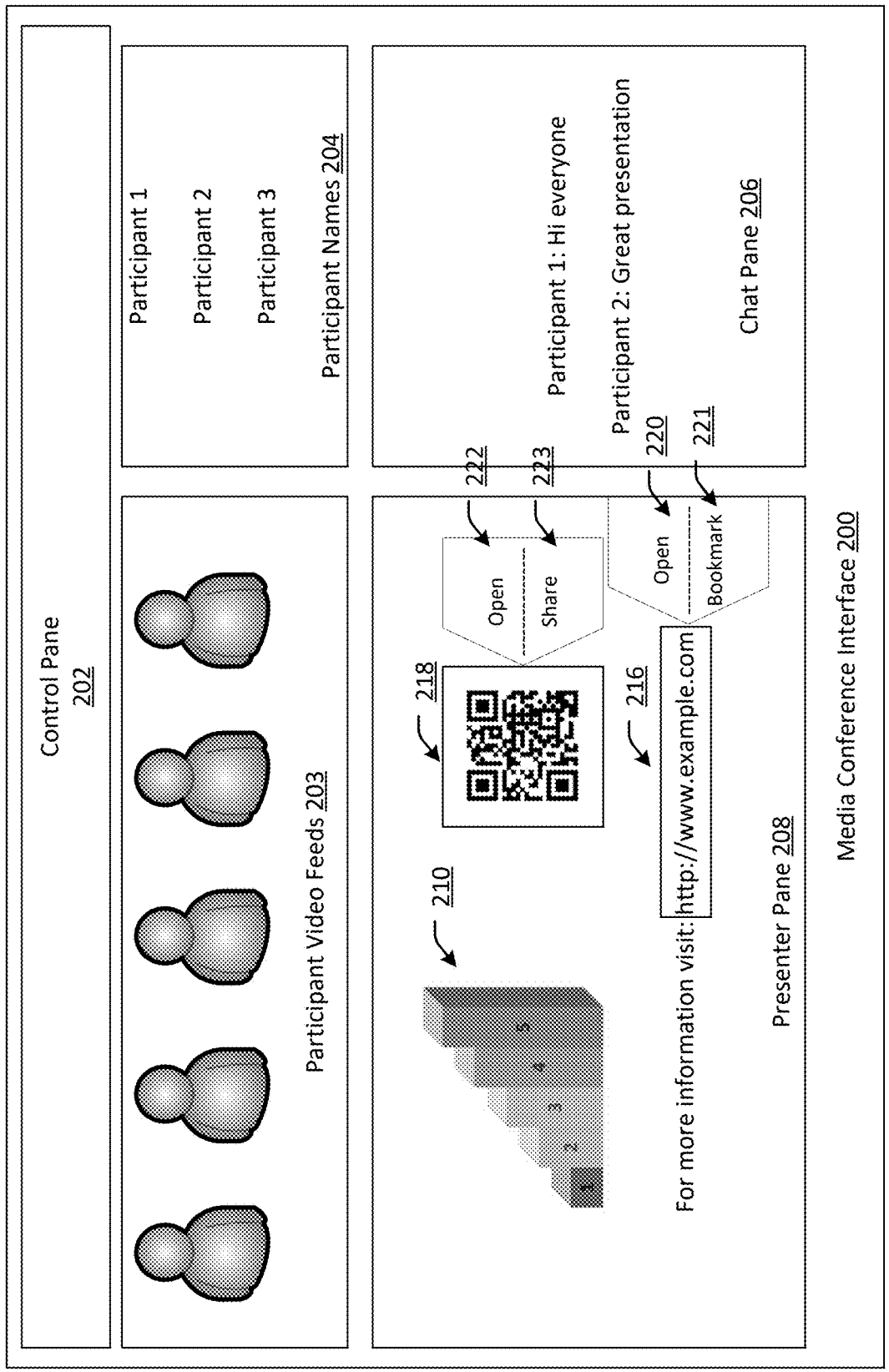

The context postprocessor 114 outputs the words/objects and/or the bounding perimeters as semantic output 120 to the server 106 for transmission to the viewer/participants 118 of the video conference over the network 104. The semantic output 120 may include metadata identifying at least one of the type of interactive content in the frame, the location and parameter information of the interactive content, and the types of actions associated with the type of interactive content. Upon reception of the content 103 and the semantic output 120 by the viewer/participant 118, the bounding perimeters may be overlaid over the shared content being displayed to the participant of the media conference. For example, as illustrated in FIG. 2C, the bounding perimeter 216 is overlaid on the URL 212 and the bounding perimeter 218 is overlaid on the two-dimensional barcode 214. Once the participant interacts within the bounding perimeters 216 and 218, such as by moving his or her cursor to a region within the bounding perimeters 216 and 218, actionable options may be presented to the participant. For example, if the participant moves his or her cursor to within the bounding perimeter 216, a popup window may be presented with an option 220 to enable the participant to open the URL 212 within a web browser. Another option 221 may also be presented in the popup window to enable the participant to bookmark the URL 212 for later access. Although two actionable options 220 and 221 are illustrated, a single or three or more actionable options can be presented to the participant based on default or customized options of the presenter, the viewer, the operating system of the viewer, or the media conferencing service 105. In addition, instead of a popup window, a separate module, such as a window or pane, may be presented if the participant moves his or her cursor to within the bounding perimeter 216. The separate window or pane may include one or both of the two actionable options 220 and 221. For example, the separate pane may be outside of the presenter pane 208 but within the media conference interface 200.

Similarly, if the participant moves his or her cursor to within the bounding perimeter 218, a popup window may be presented with an option 222 to enable the participant to open a link encoded by the two-dimensional bar code 214. Another option 223 may also be presented in the popup window to enable the participant to share the link encoded by the two-dimensional barcode 214 for later access. The option 223 for the two-dimensional barcode 214 may be different from the option 221 for the URL 212 based on default or customized options of the presenter, the viewer, the operating system of the viewer, or the media conferencing service 105. For example, the presenter 102 may configure the actionable items for a two-dimensional barcode to be accessing content linked by the two-dimensional barcode or sharing the two-dimensional barcode, which the presenter 102 may configure the actionable items for a URL to be accessing content linked by the URL or bookmarking the URL. Although two actionable options 222 and 223 are illustrated based on the two-dimensional barcode 214, a single or three or more actionable items may be presented to the participant based on default or customized options of the presenter, the viewer, the operating system of the viewer, or the media conferencing service 105.

In some embodiments, the word/object detector 110 may identify personally identifiable or financial information. For example, a password, account identifier, account number, credit card number, employee number, social security number, or the like may be accidentally shared by the presenter 102, 152. In such a scenario, the personal or financial information may be blurred when presented to the viewers of the content 103 For example, a blurring filter may be applied by the media conferencing service 105 within the area of the bounding perimeter associated with the personal or financial information.

Figure 1B:
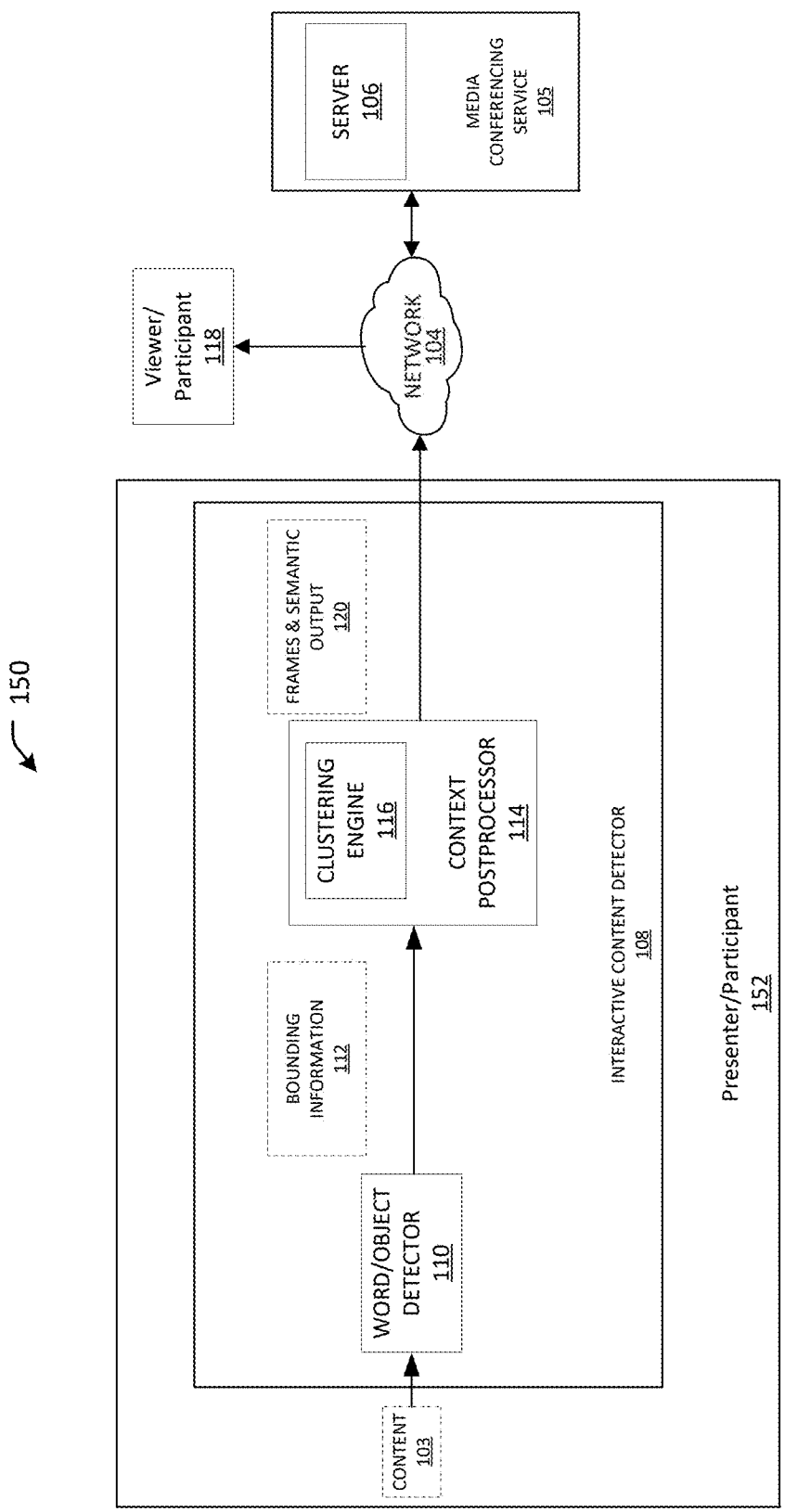
FIG. 1B schematically illustrates a high-level architecture of a presenter that includes an interactive content detector.

FIG. 1B illustrates a high-level architecture 150 of a presenter device that includes an interactive content detector, according to an embodiment. One or more participant devices 152, such as a presenter, may provide content 103, such as a presentation, video, image, website, etc. to a media conferencing service 105 via a network 104. The media conferencing service 105 can be, for example, video conferencing, chatting, gaming services, etc. The media conferencing service 105 can be implemented in one or more computing systems, such as one or more hosting servers 106, as explained in further detail below, which receive the content 103 via the network 104. The shared content 103 may be converted to compressed video at the presenter device 152. The shared content 103 may be analyzed by the interactive content detector 108 on the participant device 152 in a manner similar to that described above in connection with FIG. 1A. Specifically, the interactive content detector 108 identifies interactive content within one or more frames to be presented to the participants of the media conference. Once the semantic output 120 is determined by the interactive content detector 108, the compressed video comprising the plurality of sequential frames to be shared and the semantic output 120 are sent to the media conferencing service 105 via the network 104. The media conferencing service 105 then sends the compressed video and the semantic output 120 to one or more viewer/participant devices 118 over the network 104.

The media conferencing service 105 can then process the shared content 103 and the semantic output 120 received from the participant device 152 and output the processed content, such as the processed audio signals and/or video signals, to one or more output devices, such as the other participant devices simultaneously. The participant device 102 can be, for example, a laptop, a desktop computer, a portable computing device, a smart phone, a tablet, and/or a display, such as a television, etc.

Figure 1C:
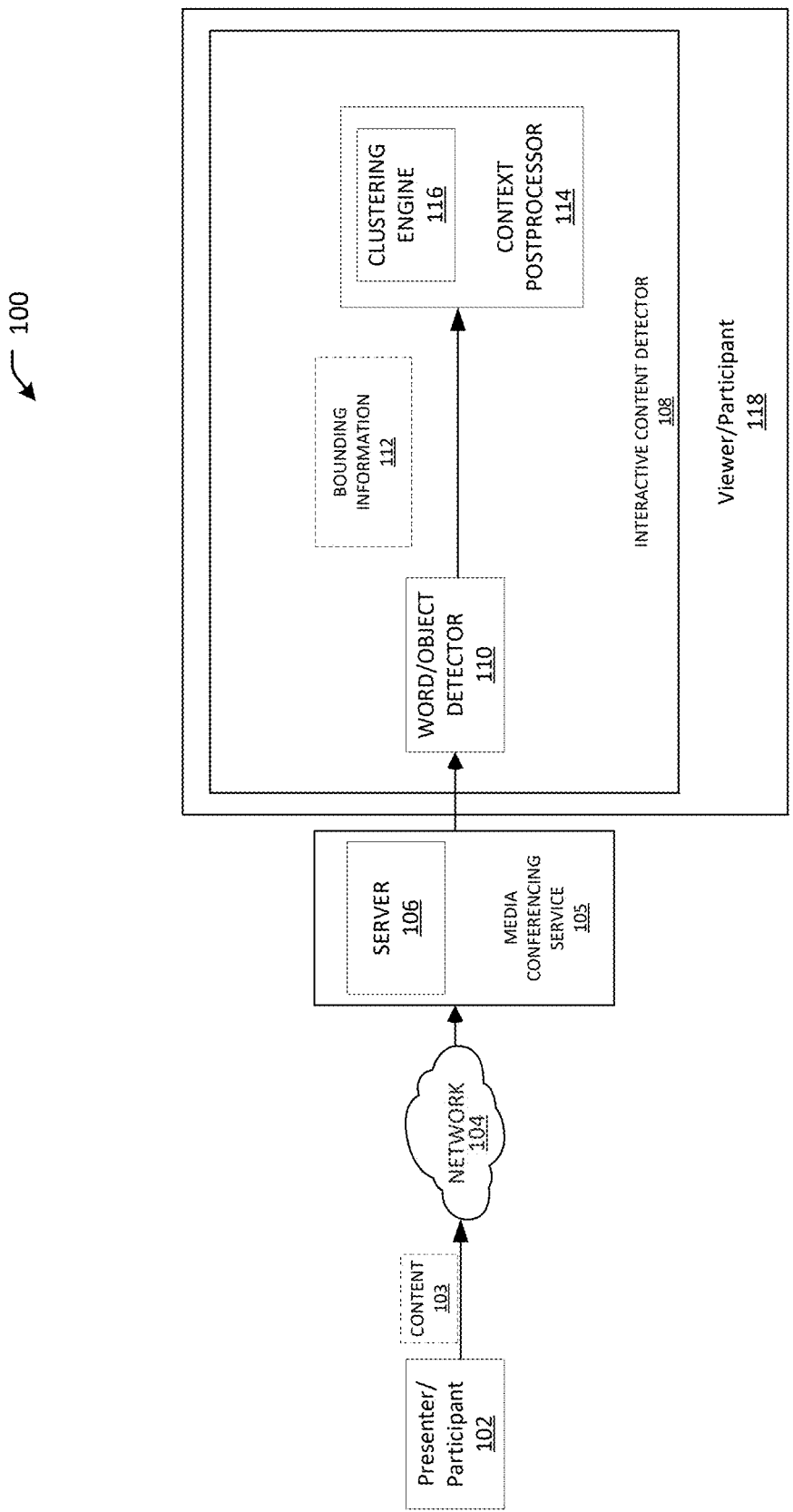
FIG. 1C schematically illustrates a high-level architecture of a viewer that includes an interactive content detector.

FIG. 1C illustrates a high-level architecture 150 of a viewer device that includes an interactive content detector, according to an embodiment. One or more participant devices 102, such as a presenter, may provide content 103, such as a presentation, video, image, website, etc. to a media conferencing service 105 via a network 104. The media conferencing service 105 can be, for example, video conferencing, chatting, gaming services, etc. The media conferencing service 105 can be implemented in one or more computing systems, such as one or more hosting servers 106, as explained in further detail below, which receive the content 103 via the network 104. The shared content 103 may be converted to compressed video at the presenter device 102 or at the media conferencing service 105. The compressed video is then sent to the viewer device 118, where it may be analyzed by the interactive content detector 108 on the viewer device 118 in a manner similar to that described above in connection with FIG. 1A. Specifically, the interactive content detector 108 identifies interactive content within one or more frames to be presented to the participants of the media conference. Once the semantic output 120 is determined by the interactive content detector 108, the compressed video comprising the plurality of sequential frames and the semantic output 120 are displayed by the viewer device 118.

Figure 3:
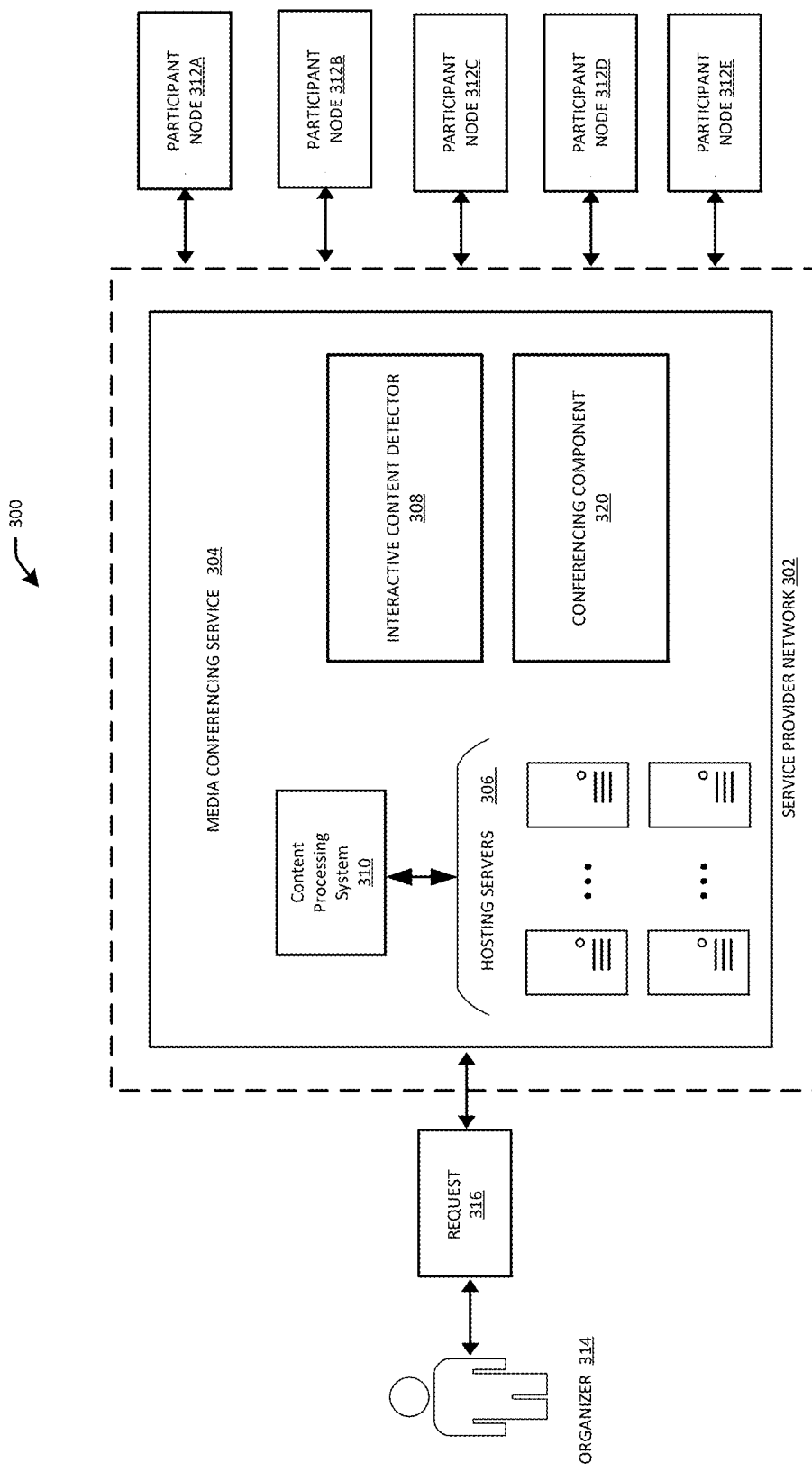
FIG. 3 schematically illustrates a system-architecture diagram of an example service provider network that provides a media conferencing service.

FIG. 3 schematically illustrates an example environment 300 that includes a service provider network 302. The service provider network 302 provides various services to users, such as participant nodes 312A-E, which can be the one or more participant devices 102. The participant nodes 312A-E may also be referred to as computing nodes. The service provider network 302 can include various types of computing resources, such as data processing resources like data storage resources, networking resources, data communication resources, network services, and the like. Common expressions associated with the service provider network may include, for example, "on-demand computing," "software as a service (Saas)," "cloud services," "data centers," and so forth. Services provided by the service provider network 302 may be distributed across one or more physical or virtual devices.

In some embodiments, as described in greater detail with reference to FIG. 5 below, a learning algorithm, such as machine learning, artificial intelligence, and/or other statistical modeling techniques, may be used to identify interactive content to be presented to the participant nodes 312A-E during a media conference.

In the example environment 300, the service provider network 302 includes a media conferencing service 304, such as an audio or video conferencing service. The media conferencing service 304 may include multiple hosting servers 306. In some embodiments, the media conferencing service 304 also includes an interactive content detector 308, such as the interactive content detector 108, and a content processing system 310. The content processing system 310 processes the shared content 103 received from a presenter and the semantic output 120 For transmission to the participant nodes 312A-E during the media conference. The media conferencing service 304 may facilitate initiation of the media conference or may otherwise allow the media conference to take place via hosting servers 306.

Multiple participant nodes 312A-E are illustrated in the example environment 300. The participant nodes 312A-E represent computing nodes, participants, input devices, output devices, clients, bots, and/or users for media conferences provided by the media conferencing service 304. The participant nodes 312A-E interact with the media conferencing service 304 and the hosting servers 306 via electronic devices such as, for example, smart phones, tablets, laptop computers, desktop computers, telephones, etc. In some embodiments, at least one of the participant nodes 312A-E may be a bot that is configured to interact in the video conference instead of a human participant. In configurations, the media conferences may comprise text, audio, and/or video, e.g., one or more of the participant nodes 312A-E may participate in a media conference that includes both audio and video. Text, audio, and/or video content can be sent between the participant nodes 312A-E via the media conferencing service 304. The media conference may be part of a gaming platform.

When one or more of the participant nodes 312A-E wishes to participate in a media conference, an organizer 314 of the media conference may send a request 316 for the media conference to the media conferencing service 304. The organizer 314 may also be a participant in the media conference. Content processed by the content processing system 310, such as the content 103, can be broadcast to one or more of the participant nodes 312A-E simultaneously.

The conferencing component 320 may initiate the media conference based on the request 316 received from the organizer 314 and authenticate the participant nodes 312A-E. The conferencing component 320 may authenticate the participant nodes 312A-E of the media conference based on identifiers of the participant nodes 312A-E and/or objects received from the participant nodes 312A-E. The conferencing component 320 may determine which participants connect to the media conferencing service 304 over time, how long they are connected to the media conferencing service 304, what devices are used by the users to connect, and the types of media conferencing services that are used, such as video, audio, text, and gaming. In some embodiments, the conferencing component 320 may continually monitor the participants of a media conference. For example, if additional participant nodes 312A-E join the media conference or if participation nodes 312A-E leave the media conference before the media conference is completed, the conferencing component 320 may record the times of arrival and the times of exit of the participants in the media conference.

Figure 4:
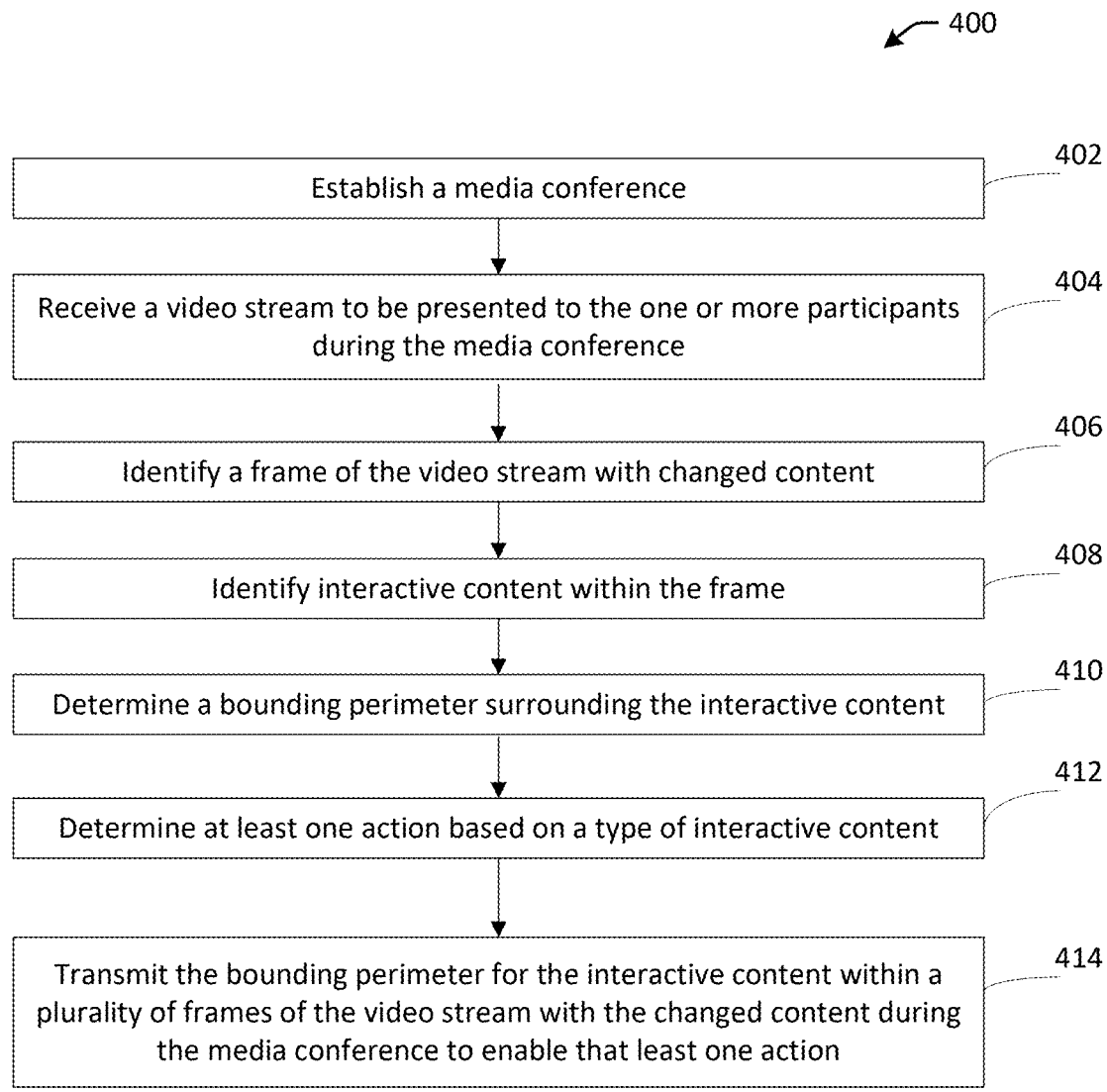
FIG. 4 is a flowchart showing an example process for detecting interactive content presented during a media conference.

FIG. 4 illustrates a flow diagram of an example method 400 that illustrates aspects of the functions performed at least partly by the interactive content detector 108 and 308 of the media conferencing service. The example method 400 may be implemented to detect interactive content presented during a media conference. The logical operations described herein with respect to FIG. 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 4, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

At block 402, the media conferencing service 204 establishes a media conference. The media conference may be established in response to the request 316 received from the organizer 314. The request 316 may include an identifier of the organizer 314, identifiers of the participant nodes 312A-E, the type of media conference, a date, time, and/or duration for the media conference. The type of media conference can be an audio conference, a video conference, a chat session, or a gaming session. The request 316 may also include an anticipated location for each participant node 312A-E. The participants, such as the organizer 314 and the participant nodes 312A-E, of the media conference may belong to the same organization or may belong to different organizations, such as different corporations. The request can also include programmable instructions regarding the layout of the media conference.

The media conference can be established between the organizer 314 and one of more of the participant nodes 312A-E, or only between the participant nodes 312A-E, via the hosting servers 306. The media conferencing service 304 can authenticate the request based on an identifier of the organizer 314 or a shadow object received from the organizer 314 including characteristics and/or keys associated with the organizer 314. The shadow objects can be, for example, cookies, tokens, session identifiers, WebSocket identifiers, client certificate chains, metadata in the HTTP or Transport Layer Security protocols, or another tracer that can be used to identify the organizer 314 of the media conference. The shadow object received from the organizer 314 can be compared to stored shadow objects to determine a match to authenticate the request.

Upon establishing the media conference, at block 404, the interactive content detector 308 may receive a video stream of shared content to be presented to the one or more participants 312A-E during the media conference from a presenter, such as the organizer 314. The video stream of the shared content may be the content 103, as described above in connection with FIG. 1A. The video stream may be a compressed video stream comprising a plurality of sequential frames illustrating content being shared by the presenter. The frames of the compressed video stream may include different types of frames, such as I-frames that don't require other video frames to decode, P-frames can use data from previous frames to decompress, and B-frames can use both previous and forward frames for data reference. The compressed video stream can be generated at the presenter device or can be generated by the media conferencing service 304 based on content received from the presenter device.

At block 406, a frame within the video stream with changed content can be determined. The determined frame can be based on reception of keyframes, or I-frames, within the compressed video or can be identified using a content change detector. The content change detector can determine whether the pixels or objects between two consecutive frames differ by more than a threshold amount. If the change is greater than the threshold amount, the frame can signify a change of content and be analyzed by the interactive content detector 308. Only the frames signifying a change in content can be used by the interactive content detector 308 to identify interactive content, thereby conserving computational resources.

At block 408, interactive content within the frame can be identified. As described above in connection with the interactive content detector 108 and 308, the interactive content can be identified by an interactive content detector within the media conferencing service or within a participant device. The interactive content detector 108 and 308 can utilize a learning algorithm or a pattern matching algorithm to identify the interactive content. The interactive content can be of one of many types such as a Uniform Resource Locator (URL), an email address, a social media handle or username, a telephone number, a barcode, a street address, a GPS coordinate, a business name, a date and time, a unit of measure, an account number, personally identifiable information, or the like. In some embodiments, the identified interactive objects can be differentiated in a transcript of the media conference using, for example, a different color for the interactive objects.

At block 410, a bounding perimeter surrounding the interactive content is determined by the interactive content detector 108 and 308. The bounding perimeter outlines the interactive object within a coordinate space defined for the frame using, for example, a height and width of the interactive object, a center point of the interactive object, an orientation of the interactive object, and/or coordinates of corners of the interactive object. The dimensions of the bounding perimeter can be adjusted based on the display preferences of each participant. For example, if one participant zooms into the shared content, the dimensions of the boundary perimeter can be increased and the center point of the bounding perimeter can be adjusted to overlap with the interactive content.

At block 412, a least one action can be determined based on a type of the interactive content. The at least one action is at least one of accessing content identified by the interactive content, contacting an individual or business identified by the interactive content, copying the interactive content, sharing the interactive content, saving the interactive content, opening a default application associated with the type of interactive content, converting units of measurement, blurring, or translating words that are in a different language than a default language of one of the participants in the media conference. The available action can be customized by the media conferencing service 304 or by an organizer 314 of the media conference, or can be default actions associated with an application or an operating system, as described in greater detail above. For example, if the interactive content is an address, then looking up the address in a default maps application can be an associated action. In another example, if the interactive content is a unit of measurement, then converting the unit of measurement into another unit of measurement can be an associated action. In another example, an organizer can set a default language or a participant viewing the content can set a default language. If words are detected that are in a different language than the default language, then those words can be translated to the default language. The translated words can be overlaid on the original words or can be displayed in a popup window or separate pane.

In some embodiments, the one or more actions associated with each type of interactive content can be different from one another such that a first action associated with a first type of interactive content can be different from a second action associated with a second type of interactive content. In addition, two or more actions can be associated with each type of interactive content.

At block 414, the bounding perimeter for the interactive content is transmitted to enable the at least one action associated with the interactive content. The bounding perimeter is transmitted for a plurality of frames of the video stream including the interactive content. Therefore, in some embodiments, the bounding perimeter can be transmitted with each keyframe and maintained until the next keyframe. For example, a group of frames, such as 10 or more frames, may be all illustrate the same slide of a presentation. The bounding perimeter can be overlaid on the same interactive content throughout all of the frames. An example of the overlayed bounding perimeters on interactive content within a slide of a presentation is illustrated in FIG. 2C, as described in greater detail above. In some embodiments, in addition to transmitting the bounding perimeter for the interactive content, the at least one action associated with the type of interactive content can also be transmitted.

The bounding perimeter can enable the at least one action to be presented to a viewing participant of the media conference in response to interaction with the bounding perimeter. The interaction can be movement of a cursor within the bounding perimeter, movement of a finger within the bounding perimeter, or selection of a region within the bounding perimeter. The viewer can then select the at least one action associated with the interactive content.

Figure 5:
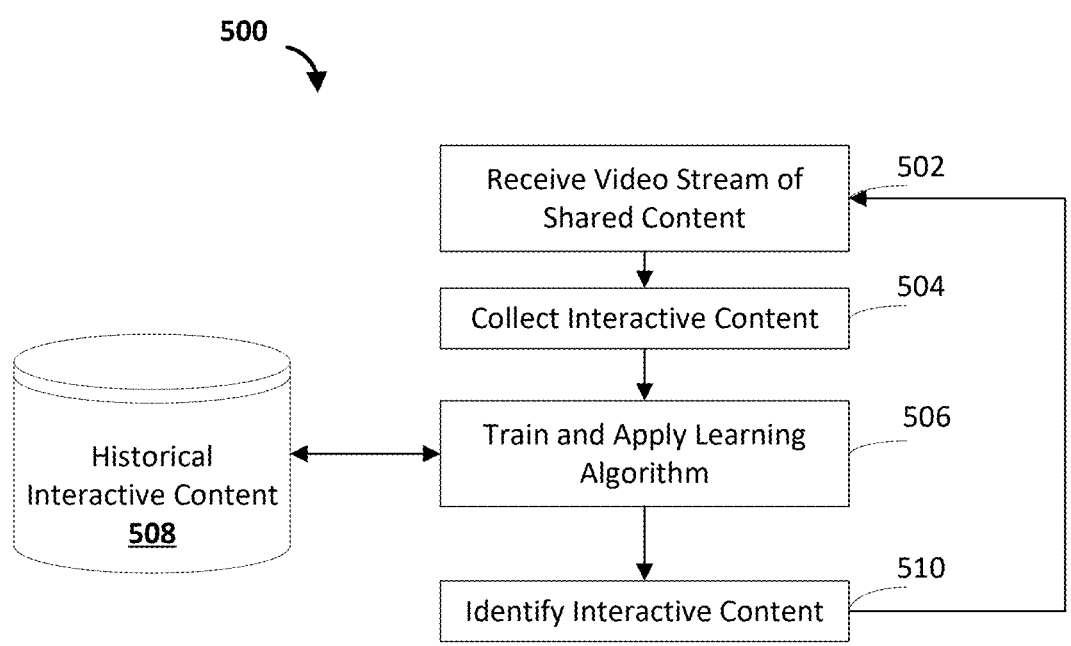
FIG. 5 is a flowchart showing an example process for training a learning algorithm to detect interactive content presented during a media conference.

FIG. 5 is a flowchart showing an example process 500 for training a learning algorithm to select identify interactive content from one or more frames. The logical operations described herein with respect to FIG. 5 may be implemented (1) as a sequence of computer-implemented acts or program modules running on a computing system, and/or (2) as interconnected machine logic circuits or circuit modules within the computing system.

At block 502, a video stream of shared content is received from a presenter up the media conference. This step may be similar to step 404 of the method 400. At block 504, during the media conference, interactive content can be identified by the interactive content detector 308, as described in greater detail above. All of the identified interactive content can be stored in data store 508. The category or type of each of the identified interactive content can also be stored in the data store 508 to be used for training the learning algorithm.

At block 506, the interactive content being identified in real-time and the historical identified interactive content stored in data store 508 can be used to continually train a learning algorithm, such as a machine learning, artificial intelligence, and/or other statistical modeling, to identify interactive content. At block 510, the learning algorithm can be used to identify interactive content in future frames and/or future shared content received by the media conferencing service 304. This step may be similar to step 410 of the method 400.

The implementation of the various methods described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 4 and 5, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

Figure 6:
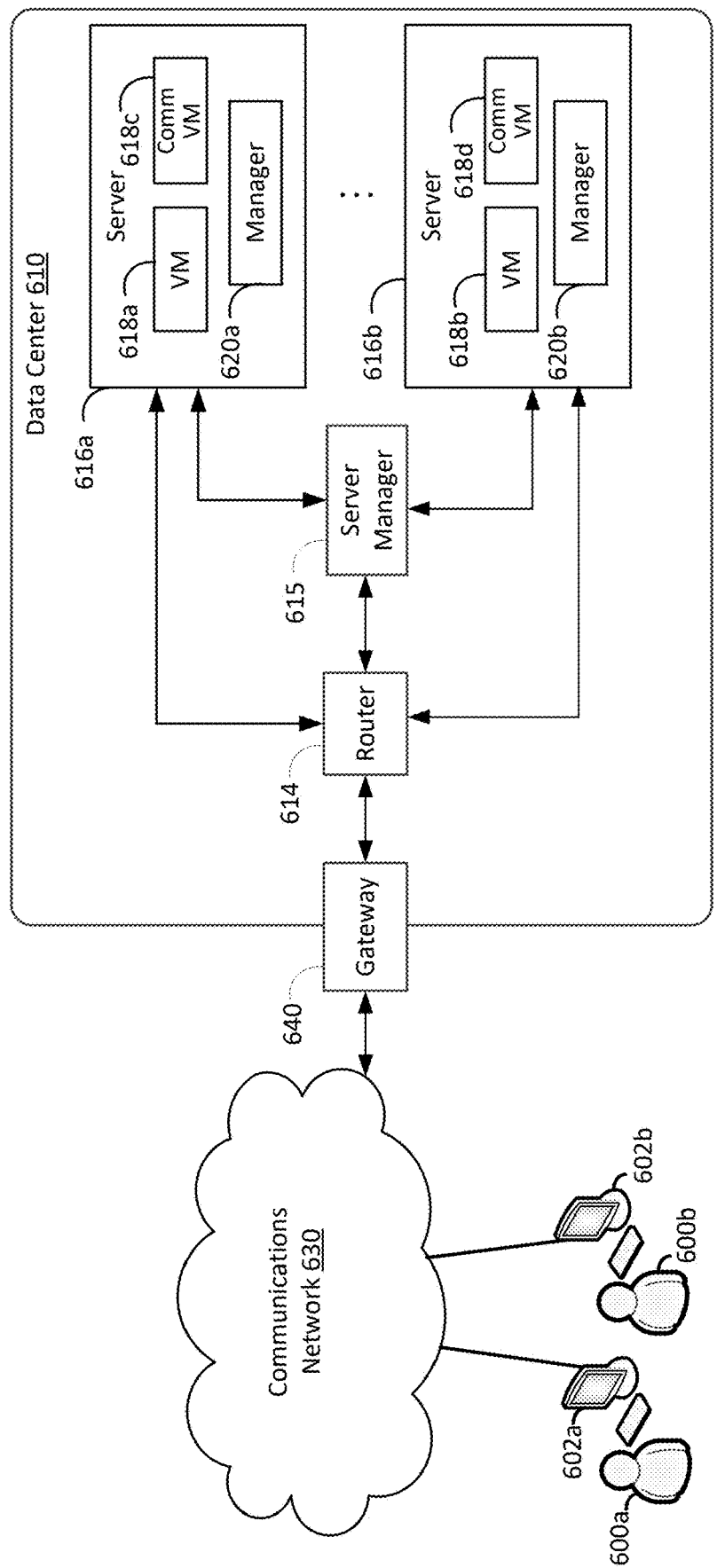
FIG. 6 is a diagram illustrating an example computing system that may be used in some embodiments.

FIG. 6 illustrates an example computing environment in which the embodiments described herein may be implemented. The example computing environment of FIG. 6 may be configured to implement one or more of the services platform, such as the media conferencing service 105 of FIGS. 1A-B or the media conferencing service 304 of FIG. 3. The example computing environment of FIG. 6 may be configured to implement any of the methods described herein, such as any methods (e.g., or any operations) associated with FIGS. 4 and 5.

FIG. 6 is a diagram schematically illustrating an example of a data center 610 that can provide computing resources to users 600*a* and 600*b* (which may be referred herein singularly as user 600 or in the plural as users 600) via user computers 602*a* and 602*b* (which may be referred herein singularly as computer 602 or in the plural as computers 602) via a communications network 630. Data center 610 may be configured to provide computing resources for executing applications on a permanent or an as-needed basis. The computing resources provided by data center 610 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices, object storage devices, and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 610 may include servers 616a-b (which may be referred herein singularly as server 616 or in the plural as servers 616) that provide computing resources. These resources may be available as bare metal resources, or as virtual machine instances 618a-d and (which may be referred herein singularly as virtual machine instance 618 or in the plural as virtual machine instances 618). Virtual machine instances 618c and 618d can be communication service virtual machine. The communication service virtual machine instances 618c and 618d may be configured to perform all or any portion of the communication services (e.g., contact center services, virtual environment services, determining virtual features, facilitating communication sessions, content services for accessing virtual environments) in accordance with the present disclosure and described in detail herein. As should be appreciated, while the particular example illustrated in FIG. 6 includes one communication service virtual machine in each server, this is merely an example. A server may include more than one communication service virtual machine or may not include any communication service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance and/or a container may be a software emulation of a particular physical computing system that acts as a distinct logical computing system. Such a virtual machine instance or container provides isolation among multiple operating systems sharing a given physical computing resource. Furthermore, some virtualization technologies may provide virtual resources that span one or more physical resources, such as a single virtual machine instance or a single container with multiple virtual processors that spans multiple distinct physical computing systems.

A communications network 630 may, for example, be a publicly accessible network of linked networks and possibly operated by various distinct parties, such as the Internet. In other embodiments, the communications network 630 may be a private network, such as, a corporate or university network that is wholly or partially inaccessible to non-privileged users. In still other embodiments, the communications network 630 may include one or more private networks with access to and/or from the Internet.

The communication network 630 may provide access to computers 602. User computers 602 may be computers utilized by users 600 or other customers of data center 610. For instance, user computer 602a or 602b may be a server, a desktop or laptop personal computer, a tablet computer, a wireless telephone, a personal digital assistant (PDA), an e-book reader, a game console, a set-top box or any other computing device capable of accessing data center 610. User computer 602a or 602b may connect directly to the Internet (e.g., via a cable modem or a Digital Subscriber Line (DSL)). Although only two user computers 602a and 602b are depicted, it should be appreciated that there may be multiple user computers.

User computers 602 may also be utilized to configure aspects of the computing resources provided by data center 610. In this regard, data center 610 might provide a gateway or web interface through which aspects of its operation may be configured through the use of a web browser application program executing on user computer 602. Alternately, a stand-alone application program executing on user computer 602 might access an application programming interface (API) exposed by data center 610 for performing the configuration operations. Other mechanisms for configuring the operation of various web services available at data center 610 might also be utilized.

Servers 616 shown in FIG. 6 may be standard servers configured appropriately for providing the computing resources described above and may provide computing resources for executing one or more web services and/or applications. In one embodiment, the computing resources may be virtual machine instances 618. In the example of virtual machine instances, each of the servers 616 may be configured to execute an instance manager 620a or 620b (which may be referred herein singularly as instance manager 620 or in the plural as instance managers 620) capable of executing the virtual machine instances 618. The instance managers 620 may be a virtual machine monitor (VMM) or another type of program configured to enable the execution of virtual machine instances 618 on server 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 614 may be utilized to interconnect the servers 616*a* and 616*b*. Router 614 may also be connected to gateway 640, which is connected to communications network 630. Router 614 may be connected to one or more load balancers, and alone or in combination may manage communications within networks in data center 610, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 610 shown in FIG. 6, a server manager 615 is also employed to at least in part direct various communications to, from and/or between servers 616*a* and 616*b*. While FIG. 6 depicts router 614 positioned between gateway 640 and server manager 615, this is merely an exemplary configuration. In some cases, for example, server manager 615 may be positioned between gateway 640 and router 614. Server manager 615 may, in some cases, examine portions of incoming communications from user computers 602 to determine one or more appropriate servers 616 to receive and/or process the incoming communications. Server manager 615 may determine appropriate servers to receive and/or process the incoming communications based on factors such as an identity, location or other attributes associated with user computers 602, a nature of a task with which the communications are associated, a priority of a task with which the communications are associated, a duration of a task with which the communications are associated, a size and/or estimated resource usage of a task with which the communications are associated and many other factors. Server manager 615 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
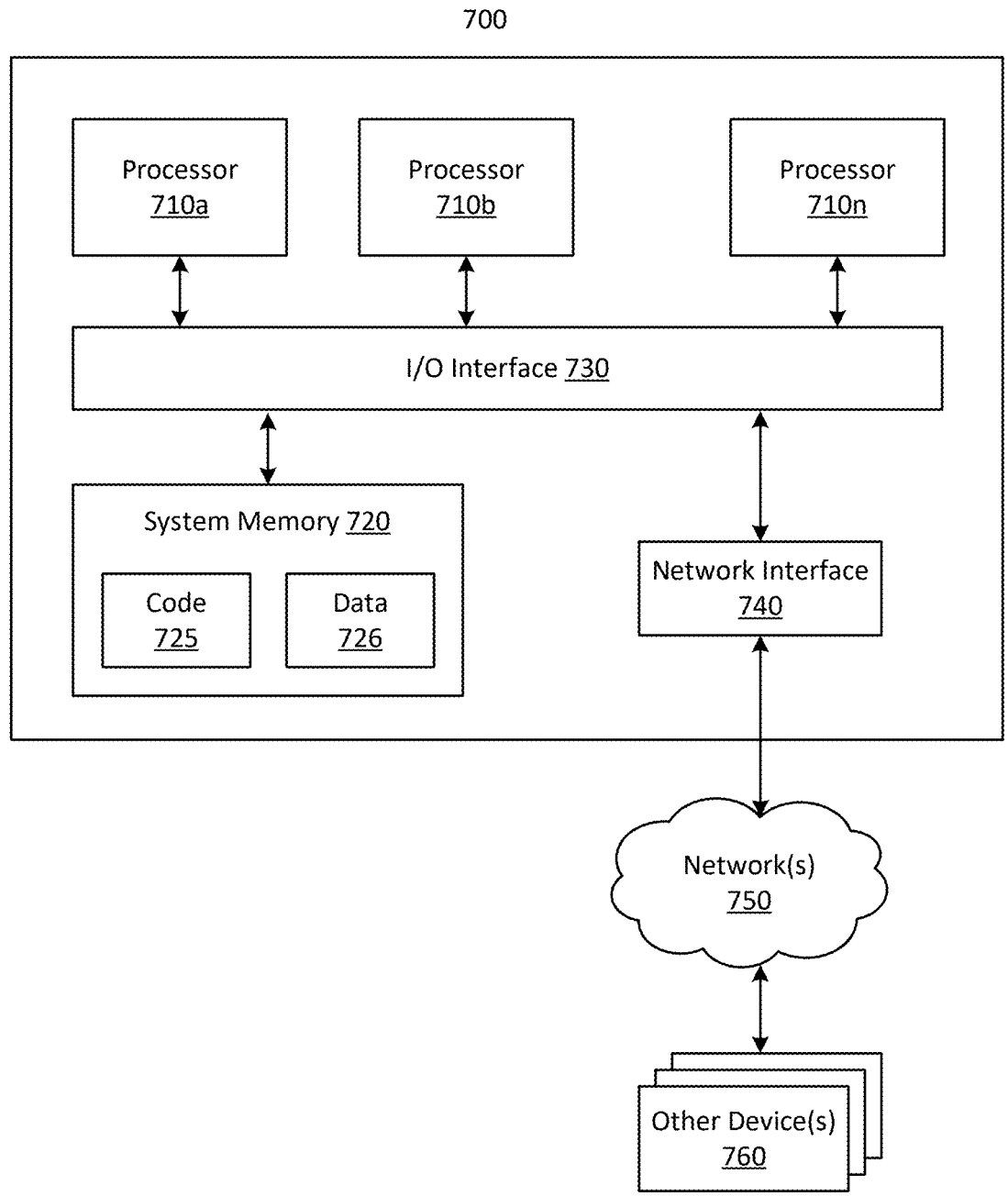
FIG. 7 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. The example computer system of FIG. 7 may be configured to implement one or more of the services platform, such as the participant device 102, the media conferencing service 105, the media conferencing service 304, the organizer 314, and the participant nodes 312A-E. The general-purpose computer system of FIG. 7 may be configured to implement any of the methods described herein, such as any methods (e.g., or any operations) associated with FIGS. 4 and 5.

In the illustrated embodiment, computing device 700 includes one or more processors 710*a*, 710*b* and/or 710*n* (which may be referred herein singularly as "a processor 710" or in the plural as "the processors 710") coupled to a system memory 720 via an input/output (I/O) interface 730. Computing device 710 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the ARM, x86, PowerPC, SPARC or MIPS ISAs or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 720 as code 725 and data 726.

In an embodiment, I/O interface 730 may be configured to coordinate I/O traffic between processor 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fiber Channel SANs (storage area networks) or via any other suitable type of network and/or protocol.

In some embodiments, system memory 720 may be a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 730. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 700 as system memory 720 or another type of memory. Further, a computer-accessible medium may include transmission media or signals such as electrical, electromagnetic or digital signals conveyed via a communication medium such as a network and/or a wireless link, such as those that may be implemented via network interface 740. Portions or all of multiple computing devices such as those illustrated in FIG. 7 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As an example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method comprising:
   receiving a frame to be presented to one or more participants during a media conference;
   identifying interactive content within the frame;
   determining a bounding perimeter surrounding the interactive content;
   determining at least one action based on a type of interactive content; and
   transmitting, to one or more participant devices corresponding to the one or more participants of the media conference, the bounding perimeter, wherein the bounding perimeter is overlaid on the interactive content within a plurality of frames, wherein the bounding perimeter presents, when selected by the one or more participants, an option to initiate the at least one action including initiating, on the one or more participant devices, accessing of other content associated with at least one of text or an object displayed within bounding perimeter.

2. The computer-implemented method of claim 1, wherein identifying the interactive content within the frame comprises identifying at least one of a Uniform Resource Locator (URL), an email address, a social media handle or username, a telephone number, a barcode, a street address, a GPS coordinate, a business name, a date and time, a unit of measure, an account number, or personally identifiable information.

3. The computer-implemented method of claim 1, wherein identifying the interactive content within the frame comprises using a learning algorithm trained with known interactive content or a pattern matching algorithm to identify the interactive content within the frame.

4. The computer-implemented method of claim 1, determining the at least one action based on the type of interactive content comprises using a configuration file to identify a plurality of actions based on the type of interactive content.

5. The computer-implemented method of claim 1, wherein identifying the interactive content within the frame comprises determining a height and a width of the interactive content.

6. The computer-implemented method of claim 5, wherein identifying the interactive content within the frame further comprises determining a location of the interactive content.

7. The computer-implemented method of claim 1, further comprising establishing the media conference, wherein receiving the frame to be presented to the one or more participants during the media conference comprises receiving the frame from a presenter of the media conference.

8. The computer-implemented method of claim 1, wherein receiving the frame to be presented to the one or more participants during the media conference comprises:
   receiving a video stream to be presented to the one or more participants during the media conference; and
   identifying a keyframe within the video stream.

9. The computer-implemented method of claim 1, wherein receiving the frame to be presented to the one or more participants during the media conference comprises determining that the frame has changed content relative to a previous frame to be presented to the one or more participants during the media conference.

10. The computer-implemented method of claim 1, wherein receiving the frame to be presented to the one or more participants during the media conference comprises determining that a predetermined time period has passed since a previous frame to be presented to the one or more participants during the media conference has been received.

11. The computer-implemented method of claim 1, wherein the at least one action includes the accessing of the other content and at least one of contacting an individual or business identified by the interactive content, copying the interactive content, sharing the interactive content, saving the interactive content, opening a default application associated with the type of interactive content, converting units of measurement, translating words, or blurring.

12. The computer-implemented method of claim 1, wherein determining the at least one action based on the type of interactive content comprises:
   determining a first action based on a first type of interactive content; and
   determining a second action based on a second type of interactive content,
   wherein the second action is different from the first action and the second type of interactive content is different from the first type of interactive content.

13. A media conferencing service comprising:
   a computing node and a non-transitory computer-readable medium, the non-transitory computer-readable medium having stored therein computer-readable instructions upon execution by the computing node configure the media conferencing service to perform operations comprising:
      establishing a media conference between a presenter and one or more participants;
      receiving, from the presenter, a video stream to be presented to the one or more participants during the media conference;
      identifying a frame of the video stream with changed content;
      identifying interactive content within the frame;
      determining a bounding perimeter surrounding the interactive content;
      determining at least one action based on a type of interactive content; and
      transmitting, to one or more participant devices corresponding to the one or more participants of the media conference, the bounding perimeter, wherein the bounding perimeter is overlaid on the interactive content within a plurality of frames of the video stream with the changed content during the media conference, wherein the bounding perimeter presents, when selected by the one or more participants, an option to initiate the at least one action including initiating, on the one or more participant devices, accessing of other content associated with at least one of text or an object displayed within bounding perimeter.

14. The media conferencing service of claim 13, wherein the computer-readable instructions upon execution configure the media conferencing service to identify the interactive content within the frame by determining a type of the interactive content.

15. The media conferencing service of claim 13, wherein the computer-readable instructions upon execution configure the media conferencing service to determine the at least one action based on the type of interactive content by:
   determining a first action based on a first type of interactive content; and determining a second action based on a second type of interactive content, wherein the second action is different from the first action and the second type of interactive content is different from the first type of interactive content.

16. The media conferencing service of claim 13, wherein the computer-readable instructions upon execution configure the media conferencing service to identify the interactive content within the frame by identifying at least one of a Uniform Resource Locator (URL), an email address, a social media handle or username, a telephone number, a barcode, a street address, a GPS coordinate, a business name, a date and time, a unit of measure, an account number, or personally identifiable information.

17. The media conferencing service of claim 13, wherein the at least one action includes the accessing of the other content and at least one of contacting an individual or business identified by the interactive content, copying the interactive content, sharing the interactive content, saving the interactive content, opening a default application associated with the type of interactive content, converting units of measurement, translating words, or blurring.

18. The media conferencing service of claim 13, wherein the computer-readable instructions upon execution configure the media conferencing service identify the interactive content within the frame using a learning algorithm trained with known interactive content or using a pattern matching algorithm.

19. A non-transitory computer-readable storage medium having stored thereon computer-readable instructions, the computer-readable instructions comprising instructions that, upon execution on one or more computing devices, at least cause:

receiving a frame to be presented to one or more participants during a media conference;

identifying interactive content within the frame;

determining a bounding perimeter surrounding the interactive content;

determining at least one action based on a type of interactive content; and transmitting, to one or more participant devices corresponding to the one or more participants of the media conference, the bounding perimeter, wherein the bounding perimeter is overlaid on the interactive content within a plurality of frames, wherein the bounding perimeter presents, when selected by the one or more participants, an option to initiate the at least one action including initiating, on the one or more participant devices, accessing of other content associated with at least one of text or an object displayed within bounding perimeter.

20. The non-transitory computer-readable storage medium of claim 19, wherein the computer-readable instructions, upon execution on the one or more computing devices, cause identifying the interactive content within the frame by using a learning algorithm trained with known interactive or using a pattern matching algorithm.

* * * * *